(12) United States Patent
Demkowicz et al.

(10) Patent No.: US 8,533,734 B2
(45) Date of Patent: Sep. 10, 2013

(54) APPLICATION PROGRAMMING INTERFACE FOR MANAGING TIME SHARING OPTION ADDRESS SPACE

(75) Inventors: Susan Z. Demkowicz, Rhinebeck, NY (US); James M. Hertzig, Tilson, NY (US); Michael P. Kasper, Poughkeepsie, NY (US); Harris M. Morgenstern, Poughkeepsie, NY (US); Gary S. Puchkoff, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 13/079,413

(22) Filed: Apr. 4, 2011

(65) Prior Publication Data

US 2012/0254889 A1    Oct. 4, 2012

(51) Int. Cl.
*G06F 9/46* (2006.01)
*G06F 3/00* (2006.01)
*G06F 15/16* (2006.01)

(52) U.S. Cl.
USPC .......................... 718/107; 719/328; 709/203

(58) Field of Classification Search
None
See application file for complete search history.

(56) References Cited

U.S. PATENT DOCUMENTS

| | | | |
|---|---|---|---|
| 4,586,134 A | 4/1986 | Norstedt | |
| 4,893,307 A * | 1/1990 | McKay et al. | 370/389 |
| 5,021,949 A | 6/1991 | Morten et al. | |
| 5,212,793 A | 5/1993 | Donica et al. | |
| 5,754,830 A | 5/1998 | Butts et al. | |
| 5,872,915 A | 2/1999 | Dykes et al. | |
| 6,125,384 A | 9/2000 | Brandt et al. | |
| 6,144,990 A | 11/2000 | Brandt et al. | |
| 6,205,415 B1 | 3/2001 | Butts et al. | |
| 6,252,591 B1 | 6/2001 | Dockweiler et al. | |
| 6,810,429 B1 | 10/2004 | Walsh et al. | |
| 6,826,597 B1 | 11/2004 | Lonnroth et al. | |
| 6,970,823 B1 | 11/2005 | Yago et al. | |
| 7,343,310 B1 | 3/2008 | Stender | |
| 7,392,506 B2 | 6/2008 | Garcowski et al. | |
| 7,523,447 B1 | 4/2009 | Callahan et al. | |
| 7,761,484 B2 | 7/2010 | Christensen et al. | |

(Continued)

OTHER PUBLICATIONS

"BMC MainView AutoOPERATOR for z/OS," BMC Software, Copyright 2005-2011 BMC Software, Inc., [online]; [retrieved on Feb. 28, 2011]; retrieved from the Internet http://www.bmc.com/products/product-listing/28229-8571-2061.html.

(Continued)

*Primary Examiner* — Kenneth Tang
(74) *Attorney, Agent, or Firm* — Cantor Colburn LLP; William A. Kinnaman, Jr.

(57) ABSTRACT

A method includes receiving a start request from a client at a launcher application programming interface (API), determining whether an existing time sharing option (TSO) address space associated with a user of the client is available, retrieving security environment data associated with the user from a security product responsive to determining that no existing TSO address space associated with a user of the client is available, saving the retrieved security environment data as a security object, generating a message queue, generating a terminal status block (TSB) and saving the terminal status block, creating a TSO address space in a processor, sending an instruction to an operating system to start the TSO address space, and sending a message queue identifier associated with the message queue and an address space token associated with the TSO address space to the client.

20 Claims, 4 Drawing Sheets

(56) References Cited

U.S. PATENT DOCUMENTS

| | | | |
|---|---|---|---|
| 7,769,828 | B2 | 8/2010 | Nadel et al. |
| 2005/0149347 | A1 | 7/2005 | Chew |
| 2005/0262493 | A1 | 11/2005 | Schmidt et al. |
| 2007/0118648 | A1 | 5/2007 | Millefiorini et al. |
| 2007/0277174 | A1 | 11/2007 | Cai et al. |
| 2009/0094315 | A1* | 4/2009 | Nadel et al. .............. 709/203 |
| 2009/0172792 | A1 | 7/2009 | Backhouse |
| 2009/0199077 | A1 | 8/2009 | Sar et al. |
| 2009/0327468 | A1 | 12/2009 | Hirsch et al. |
| 2010/0076956 | A1 | 3/2010 | Ranney et al. |
| 2010/0083277 | A1 | 4/2010 | Malladi et al. |
| 2010/0185862 | A1 | 7/2010 | Moore et al. |
| 2011/0161349 | A1 | 6/2011 | Ireland et al. |
| 2012/0254372 | A1 | 10/2012 | Vandendorpe |

OTHER PUBLICATIONS

"CA Endevor Software Change Manager," Copyright 2011 CA, [online]; [retrieved on Feb. 28, 2011]; retrieved from the Internet http://www.ca.com/us/products/detail/ca-endevor-software-change-manager.aspx.

Personal Communications [online]; [retrieved on Feb. 25, 2011]; retrieved from the Internet http://www-01.ibm.com/software/network/pcomm/.

Rational Host Access Transformation Services, [online]; [retrieved on Feb. 25, 2011; retrieved from the Internet http://www-01.ibm.com/software/awdtools/hats/.

"TSO/ISPF Client Gateway," IBM Library Server, Copyright 1989, 2005 IBM Corporation, [online]; [retrieved on Feb. 28, 2011]; retrieved from the Internet http://publibz.boulder.ibm.com/cgi-bin/bookmgr/BOOKS/ispzpc80/1.3.4.

Websphere Host On-Demand, [online]; [retrieved on Feb. 25, 2011]; retrieved from the Internet http://www-01.ibm.com/software/sebservers/hostondemand/.

IBM developerWorks, "Convert XML to JSON in PHP", Date: Jun. 5, 2007, "http://www.ibm.com/developerworks/xml/library/x-xml2jsonphp/#N1014C".

IBM, "Queueing and Serialization method for Software Pipes on Large Scale Operating Sytems", IBM Technical Disclsoure Bulletin; pp. 71-74 [Docuemtn ID: NN961271} published Dec. 1, 1996.

* cited by examiner

APPLICATION PROGRAMMING INTERFACE FOR MANAGING TIME SHARING OPTION ADDRESS SPACE

The present invention relates to mainframe computing, and more specifically, to mainframe computing with time sharing option (TSO).

Mainframe computers typically interact with terminals that are communicatively connected to the mainframe. The terminals are operative to send and receive messages and data using TSO messages and interactive system productivity facility (ISPF) messages. TSO allows a user to, for example, create, maintain, and compile programs and interactively test batch and on-line programs. ISPF provides a terminal interface having a set of panels. The panels often include means to run tools on TSO. ISPF often includes an application programming interface (API).

BRIEF SUMMARY

According to one embodiment of the present invention, a method includes receiving a start request from a client at a launcher application programming interface (API), determining whether an existing time sharing option (TSO) address space associated with a user of the client is available, retrieving security environment data associated with the user from a security product responsive to determining that no existing TSO address space associated with a user of the client is available, saving the retrieved security environment data as a security object, generating a message queue, generating a terminal status block (TSB) and saving the terminal status block, creating a TSO address space in a processor, sending an instruction to the TSO address space to start the TSO address space, and sending a message queue identifier associated with the message queue and an address space token associated with the TSO address space to the client.

According to another embodiment of the present invention, a system includes a client processor, and a processor communicatively connected to the client processor, the processor operative to receive a start request from the client processor at a launcher application programming interface (API), determine whether an existing time sharing option (TSO) address space associated with a user of the client is available, retrieve security environment data associated with the user from a security product responsive to determining that no existing TSO address space associated with a user of the client processor is available, save the retrieved security environment data as a security object, generate a message queue, generate a terminal status block (TSB) and save the terminal status block, create a TSO address space in a processor, send an instruction to the TSO address space to start the TSO address space, and send a message queue identifier associated with the message queue and an address space token associated with the TSO address space to the client.

According to yet another embodiment of the present invention, a non-transitory computer-readable storage medium including computer executable instructions that, when executed on a processor of a computer apparatus, directs the processor to perform a method where the method comprises receiving a start request from a client at a launcher application programming interface (API), determining whether an existing time sharing option (TSO) address space associated with a user of the client is available, retrieving security environment data associated with the user from a security product responsive to determining that no existing TSO address space associated with a user of the client is available, saving the retrieved security environment data as a security object, generating a message queue, generating a terminal status block (TSB) and saving the terminal status block, creating a TSO address space in a processor, sending an instruction to the TSO address space to start the TSO address space, and sending a message queue identifier associated with the message queue and an address space token associated with the TSO address space to the client.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
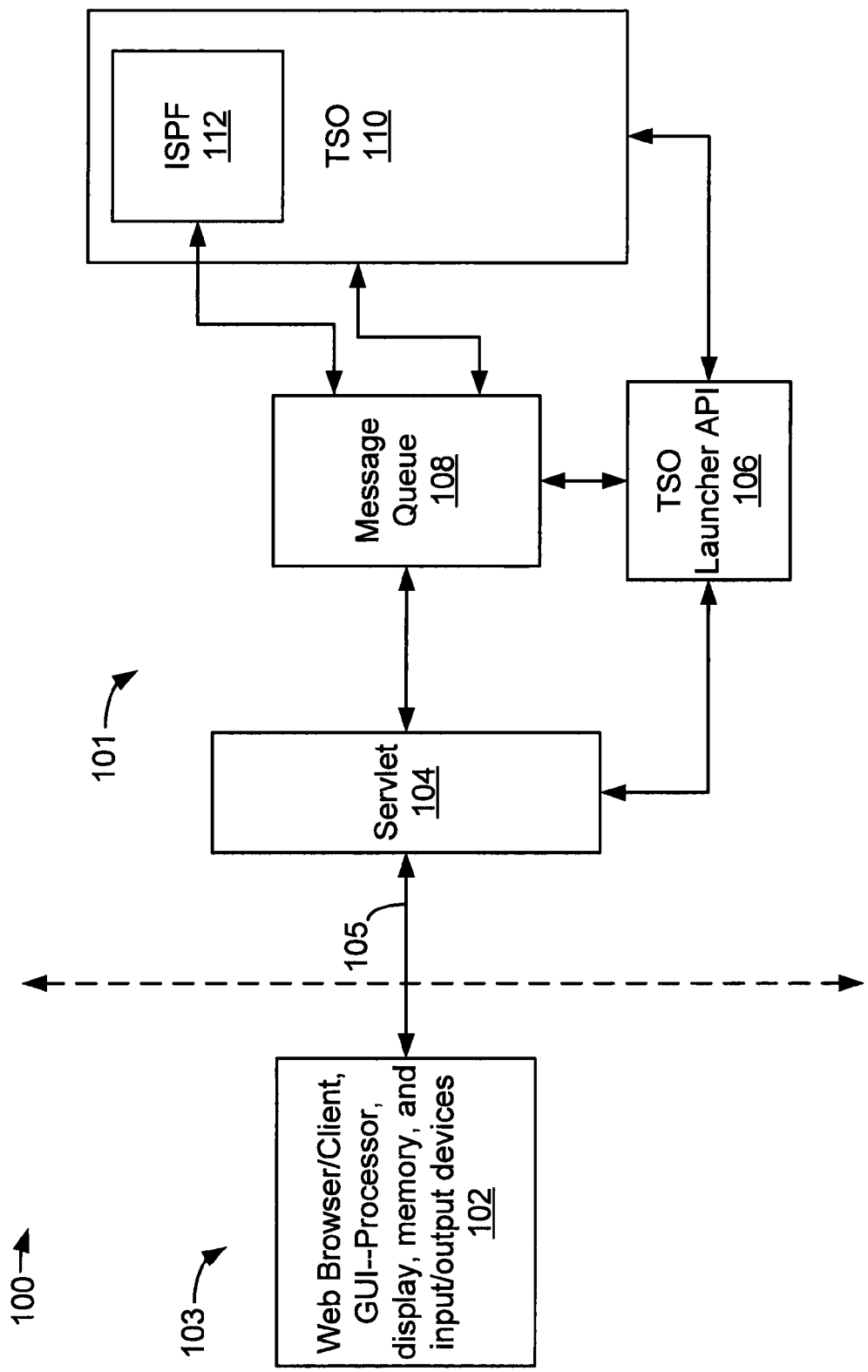
FIG. 1 illustrates a block diagram of an exemplary embodiment of a system.

FIG. 1 illustrates a block diagram of an exemplary embodiment of a system 100. The system 100 includes a processor (mainframe) 101 that includes, for example a processor such as a mainframe and associated memory, input, and output devices that are operative to perform, for example, processing tasks and applications, and a user processor 103 that may include, for example a processing terminal or computer that includes a processor, memory, input, output, and display devices that are operative to perform processing tasks and applications and may receive and present data to a user via a graphical user interface (GUI). The user processor 103 includes a web browser and/or web client (client) 102 that operates on a computer and is communicatively connected to the processor 101 via a communicative link 105 that may include, for example, an Internet or other type of network communicative connection. The client 102 is operative to send and receive data to and from the processor 101 and present the data to a user. In the illustrated embodiment, the client 102 acts as a terminal user interface. The processor 101 includes a number of entities that may include for example, applications or services that may be processed and performed by the processor 101. The processor 101 includes a servlet portion 104 that is communicatively connected to the client 102. The servlet 104 is operative to send and receive data from the time sharing option (TSO) launcher API 106 and message queues 108. Each message queue 108 is associated with a time sharing option (TSO) address space and an interactive system productivity facility (ISPF) session. In alternate embodiments, the client 102 and servlet 104 may or may not be present and may depend on a state of the system 100. Though the illustrated embodiment includes a single client 102, alternate embodiments may include any number of similar clients 102 that may be communicatively connected to the servlet 104. The processor 101 may perform or reserve address spaces for any number of message queues 108 and associated TSO 110 and ISPF 112 sessions.

In this regard, the servlet 104 provides interfaces for the client 102 to request a TSO 110 address space. Once the TSO address space 110 is reserved, the servlet 104 may send and receive both TSO and ISPF messages to and from the TSO 110 and ISPF 112. The servlet 104 communicates with the client 102 using a JavaScript Object Notation (JSON) message format and converts messages received from the client 102 into a Unicode Transformation Format-8-bit (UTF-8) format readable by the TSO 110 address space (unless the messages have been received in UTF-8 format) such as, for example, {"TSO RESPONSE": {"VERSION":"0100", "DATA":"TIME"}} The client 102 is operative to receive JSON messages from the servlet 104 and convert the JSON messages into a format that may be displayed to a user in a web browser interface using a communications protocol such as, for example hypertext transfer markup language (HTML) or another type of communications protocol. The servlet 104 provides a service to the client 102 to, for example, terminate the address space by calling the launcher API 106 and provides "housekeeping duties" to properly maintain the address spaces in the processor 101 by calling the launcher API 106. In the illustrated embodiments the interactions with the message queues 108, the launcher API 106 and TSO 110 address spaces may be performed using user credentials provided by the client 102. The servlet 104 maintains a hash map that maps the client 102 or user to the proper message queue 108 and maintains other pertinent data.

Figure 2:
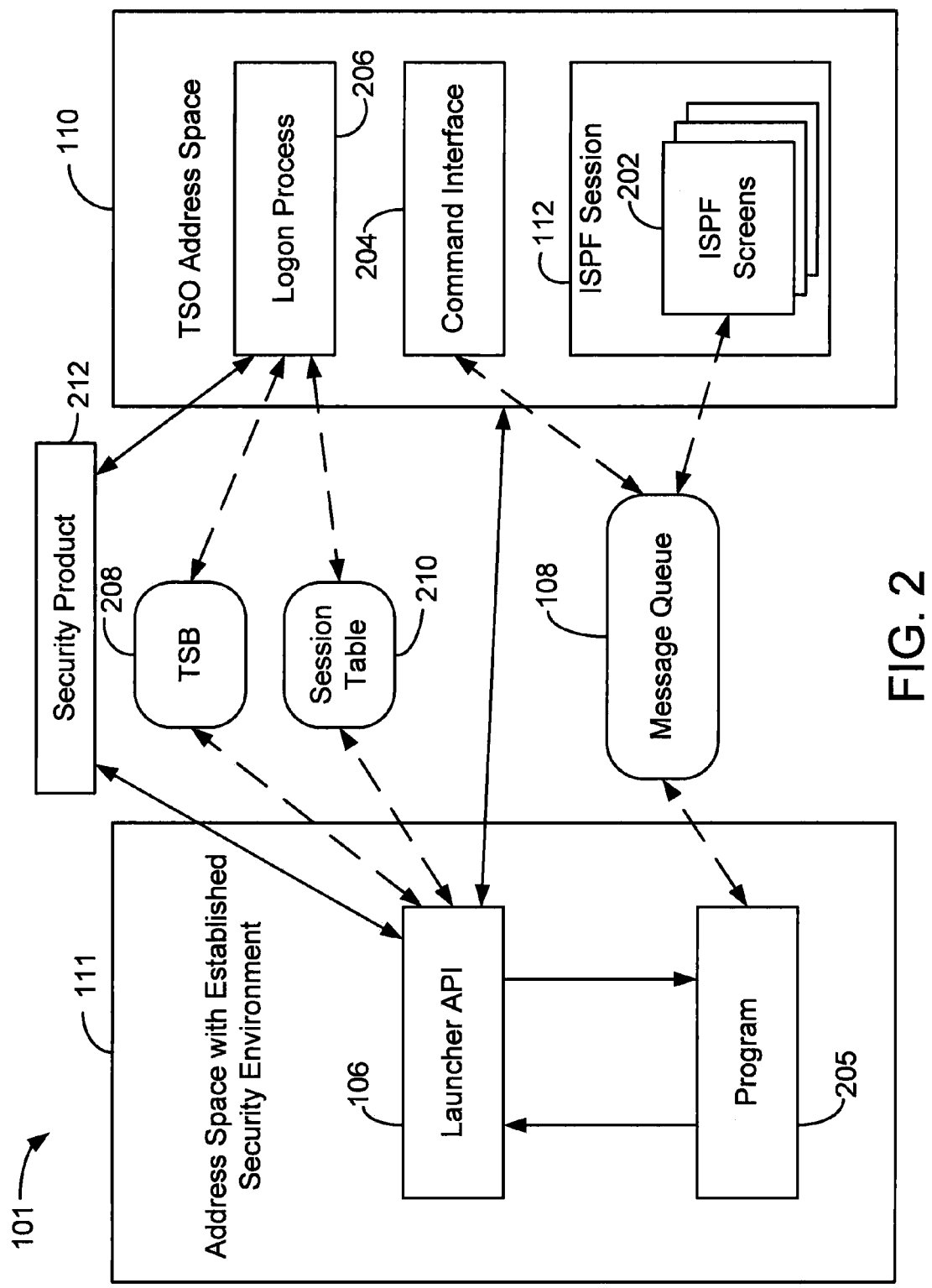
FIG. 2 illustrates a block diagram of an exemplary embodiment of processes that may operate on the processor of FIG. 1.

FIG. 2 illustrates a block diagram of an exemplary embodiment of processes that may operate on the processor 101 (of FIG. 1). FIG. 2 includes the TSO 110 address space having the ISPF 112 session with ISPF screens 202, a command interface portion 204, and a logon process 206. The command interface portion 204 is the primary means of interacting with TSO 110. Commands or data are received as input and messages or prompts are returned as output by TSO 110. The message queue 108 is operative to send and receive messages between the program 205, the command interface 204, and the ISPF screens 202. The command interface portion 204 may interact through a terminal device, but may also operate by reading from and writing to a file or in the illustrated embodiments, the message queue 108. An address space 111 that has an established security environment is shown for illustrative purposes. In this regard, the security product 212 is invoked to confirm the identity of the user and the credentials of the user, and authorities are established for the given address space. The address space 111 may include the launcher API 106 and a program 205 that may include, for example a software process that runs in the address space 111. A terminal status block (TSB) 208 is operative to save data stored and retrieved by the launcher API 106 and the logon process 206. A session table 210 includes a table stored in common memory that is populated with entries such as, for example, an address space token associated with the TSO 110 address space, a message queue identifier that is associated with a particular message queue 108, a security environment (ENVR) object associated with the user that may be retrieved from the security product 212 and logon options. The logon options may include, for example, a logon procedure name, a region size, and/or an account number. The ENVR object may include information such as the userid, authorization level, and/or connections to group security profiles.

Figure 3:
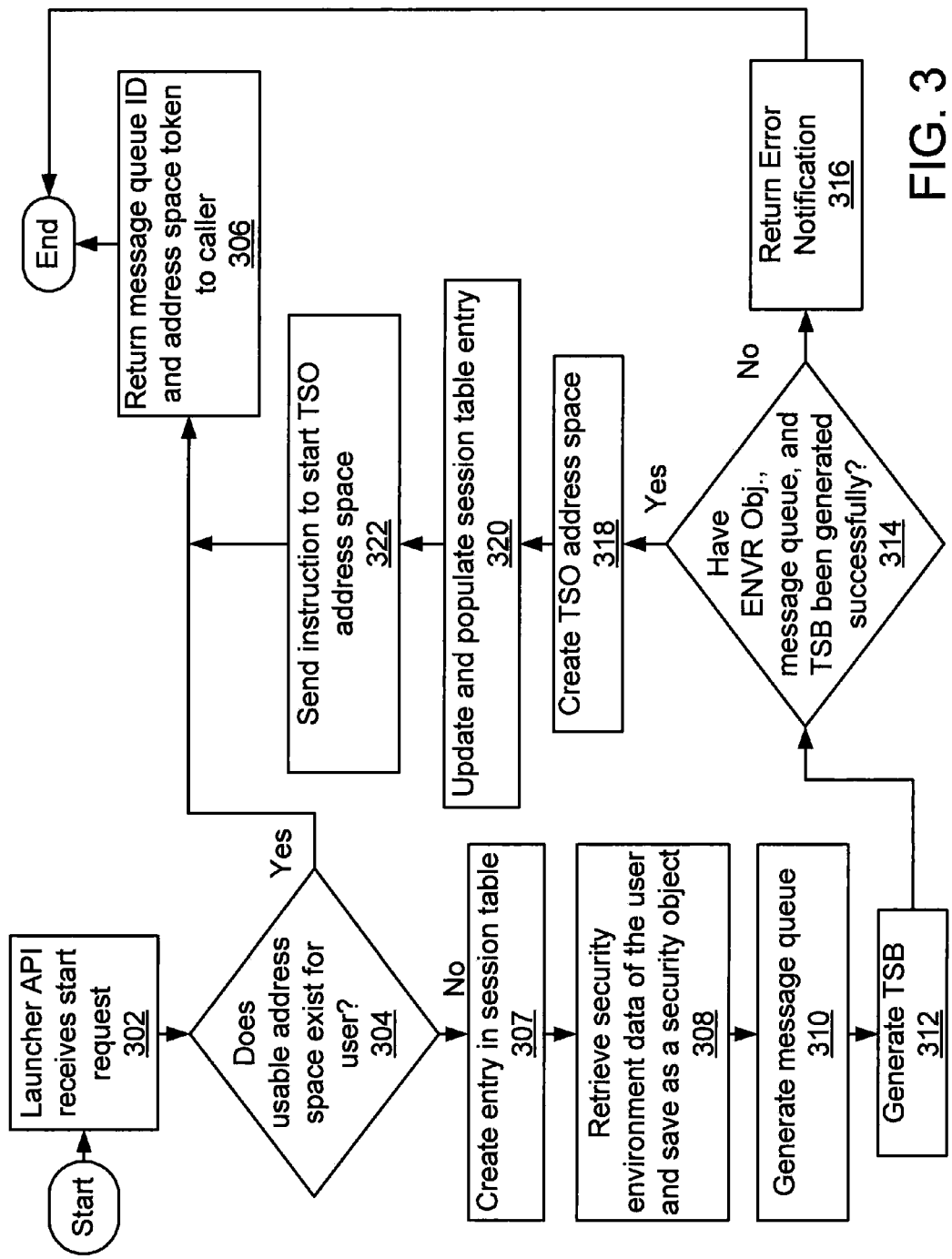
FIG. 3 illustrates a block diagram of an exemplary method for initializing and accessing a TSO address space on the processor of FIG. 1.

FIG. 3 illustrates a block diagram of an exemplary method for initializing and accessing an address space on the processor 101 (of FIG. 1). Referring to FIG. 3, in block 302, the launcher API 106 receives a request to start a process in a TSO 110 address space from a user via the client 102. In block 304, the launcher API 106 determines whether there is an existing TSO 110 address space associated with the user that was previously created by the launcher API 106 and is not being used for another process by checking the session table 210 entries to identify any unused TSO 110 address space that may be available for the user. If a usable address space is available for the user, an identifier of the message queue 108 associated with the identified address space is retrieved along with a token associated with the TSO 110 address space and returned to the caller or client 102. If no (in block 304), the launcher API 106 creates an entry in the session table 210 that is associated with the request in block 307. A security environment (ENVR) object for the user is retrieved from the security product 212 and saved in block 308. The security product 212 generates the ENVR object by using an access control environment element (ACEE) associated with the address space 111 (of FIG. 1). In block 310, a message queue is generated. A terminal status block is generated and saved in a common storage area in block 312. A common storage area is a portion of memory in the processor 101 that may be accessed by different services operating in different address spaces on the processor 101. In block 314, the launcher API 106 determines whether the security environment (ENVR) object, message queue, and TSB have been successfully saved and/or generated. The launcher API 106 may make this determination by, for example, determining whether each of the blocks 307, 308, 310 and 312 processes have been performed with no errors. If no, an error notification is returned to the caller or client 102 in block 316. If yes (in block 314), a TSO 110 address space is created in block 318. The TSO 110 address space is created by, for example, reserving an address space by invoking the operating system service to LOGON a new address space. In block 320, the session table 210 is updated by populating an entry in the session table 210 with the unique address space token associated with the newly created TSO 110 address space, a message queue identifier that is associated with the message queue 108 (which, in turn, is associated with the TSO 110 address space), the security object (ENVR object) associated with the user, and logon options associated with the user. In block 322, instructions are sent to the operating system to start or initialize the created TSO 110 address space in block 322. Once the TSO 110 address space is started, the message queue ID and address space token are returned to the client 102 in block 306. The client 102 may then interact with the TSO 110 address space to run desired programs or services within the TSO 110 address space. Once the TSO 110 address space is started by the operating system, the TSO 110 address space is initialized by a process performed in the TSO 110 address space.

Figure 4:
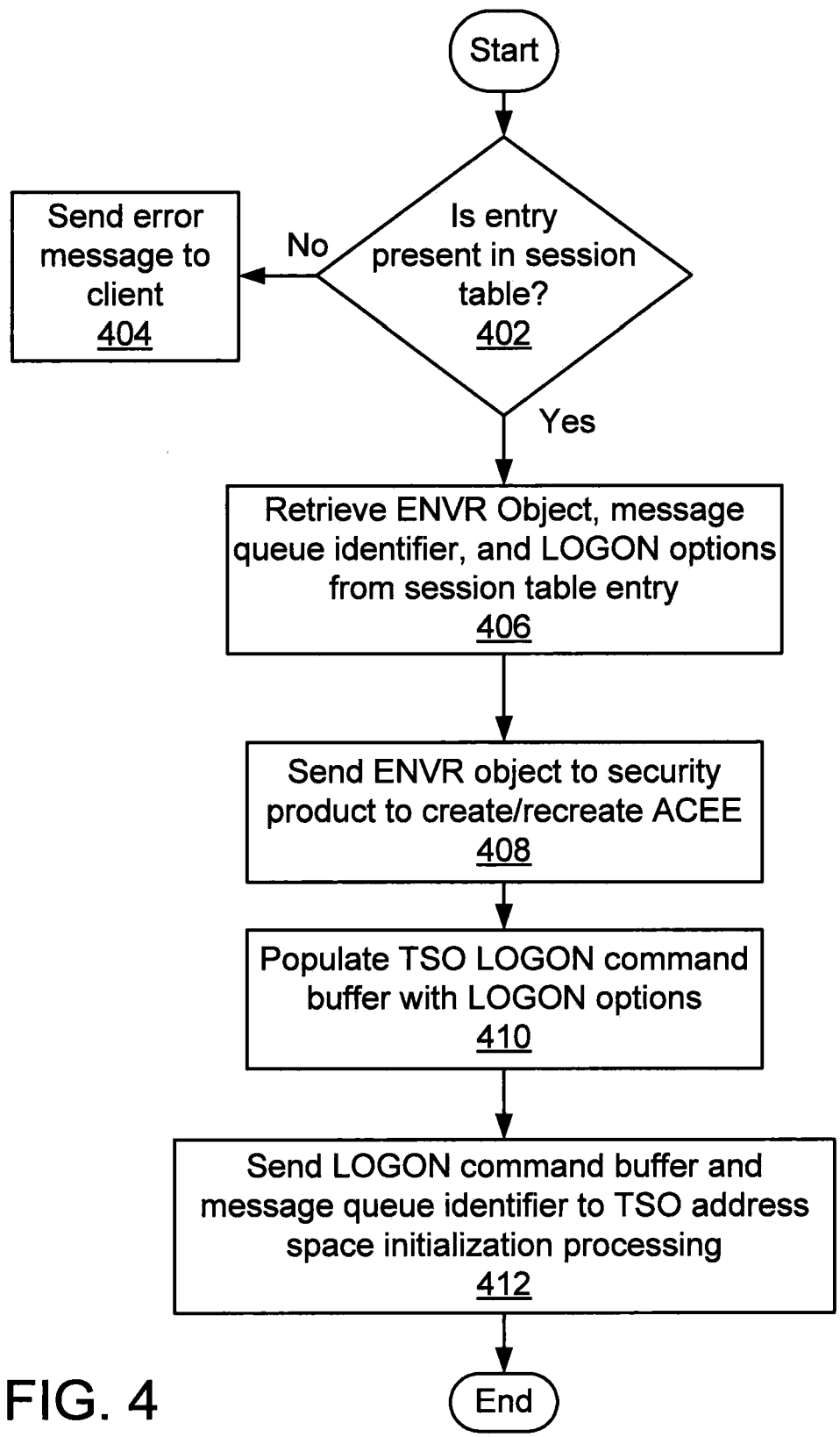
FIG. 4 illustrates a block diagram of an exemplary method called by the TSO address space of FIG. 1 to establish the security environment of the TSO address space and populate the TSO logon command buffer.

FIG. 4 illustrates a block diagram of an exemplary method called by the TSO 110 address space to establish the security environment of the TSO 110 address space and populate the TSO logon command buffer. The TSO logon command is used to complete initialization of the TSO 110 address space and initializes the command interface 204 (of FIG. 2). In this regard, a security environment is established and created in the TSO 110 address space. This occurs when TSO 110 address space initialization process determines that the TSO 110 address space was created by the launcher API 106 as indicated by status information in the TSB 208 (of FIG. 2). The TSO 110 address space initialization process invokes the launcher API 106 service to perform special initialization processing. Referring now to FIG. 4, in block 402, the launcher API 106 determines whether the session table includes an entry with the desired address space token, security object (ENVR object), message queue identifier, and logon options. If the session table entry is not present in the session table 210, the launcher API 106 may send an error notification to the client 102 in block 404. If the desired entry is present, the launcher API 106 retrieves the ENVR object, message queue identifier, and logon options in block 406. In block 408, the launcher API 106 sends the ENVR object to the security product 212. The security product 212 creates or recreates the access control environment element (ACEE) that is associated with the ENVR object. In block 410, the launcher API 106 populates a TSO LOGON command buffer with the retrieved logon options. The launcher API 106 sends the contents of the LOGON command buffer and the message queue identifier to the TSO 110 address space initialization processing in block 412. Once the security environment is established, TSO control blocks are initialized to associate the message queue 108 with the TSO address space, and instruct the TSO 110 address space to communicate with the client 102 via the message queue 108.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, PL/I, or assembler programming languages such as HL/ASM. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
    receiving a start request from a client at a launcher application programming interface (API);
    determining whether an existing time sharing option (TSO) address space associated with a user of the client is available;
    retrieving security environment data associated with the user from a security product responsive to determining that no existing TSO address space associated with a user of the client is available;
    saving the retrieved security environment data as a security object;
    generating a message queue;
    generating a terminal status block (TSB) and saving the terminal status block;
    creating a TSO address space in a processor;
    sending an instruction to an operating system to start the TSO address space; and
    sending a message queue identifier associated with the message queue and an address space token associated with the TSO address space to the client.

2. The method of claim 1, further comprising sending a message queue identifier associated with the message queue and an address space token associated with the TSO address space to the client responsive to determining that an existing TSO address space associated with the user of the client is available.

3. The method of claim 1, wherein the creating the TSO address space in the processor includes:
    establishing a security environment in the created TSO address space;
    conducting a TSO address space logon; and
    initializing communications with the client via the message queue associated with the TSO address space.

4. The method of claim 3, wherein the conducting the TSO address space logon includes:
    defining a TSO logon command with data retrieved from a session table; and
    logging onto the TSO address space using the TSO logon command.

5. The method of claim 3, wherein the initializing communication with the client via the message queue associated with the TSO address space includes sending a message to the client via the message queue.

6. The method of claim 1, wherein the method further includes:
    determining whether the security object has been saved successfully and whether the message queue and TSB have been generated successfully;
    sending an error message to the client responsive to determining that the security object has not been saved successfully; and
    sending an error message to the client responsive to determining that at least one of the message queue and the TSB have not been generated successfully.

7. The method of claim 1, wherein the method is at least partially performed by the launcher API that runs on the processor.

8. A system, comprising:
    a client processor; and
    a processor communicatively connected to the client processor, the processor operative to receive a start request from the client processor at a launcher application programming interface (API), determine whether an existing time sharing option (TSO) address space associated with a user of the client is available, retrieve security environment data associated with the user from a security product responsive to determining that no existing TSO address space associated with a user of the client processor is available, save the retrieved security environment data as a security object, generate a message queue, generate a terminal status block (TSB) and save the terminal status block, create a TSO address space in a processor, send an instruction to an operating system to start the TSO address space, and send a message queue identifier associated with the message queue and an address space token associated with the TSO address space to the client.

9. The system of claim 8, wherein the processor is further operative to send a message queue identifier associated with the message queue and an address space token associated with the TSO address space to the client responsive to determining that an existing TSO address space associated with the user of the client is available.

10. The system of claim 9, wherein the creating the TSO address space in the processor includes establishing a security environment in the created TSO address space, conducting a TSO address space logon, and initializing communications with the client via the message queue associated with the TSO address space.

11. The system of claim 10, wherein the conducting the TSO address space logon includes:
- defining a TSO logon command with data retrieved from a session table; and
- logging onto the TSO address space using the TSO logon command.

12. The system of claim 10, wherein the initializing communication with the client via the message queue associated with the TSO address space includes sending a message to the client via the message queue.

13. The system of claim 9, wherein the processor is further operative to determine whether the security object has been saved successfully and whether the message queue and TSB have been generated successfully; send an error message to the client responsive to determining that the security object has not been saved successfully, and send an error message to the client responsive to determining that at least one of the message queue and the TSB have not been generated successfully.

14. A non-transitory computer-readable storage medium including computer executable instructions that, when executed on a processor of a computer apparatus, directs the processor to perform a method for managing time sharing option address space, the method comprising:
- receiving a start request from a client at a launcher application programming interface (API);
- determining whether an existing time sharing option (TSO) address space associated with a user of the client is available;
- retrieving security environment data associated with the user from a security product responsive to determining that no existing TSO address space associated with a user of the client is available;
- saving the retrieved security environment data as a security object;
- generating a message queue;
- generating a terminal status block (TSB) and saving the terminal status block;
- creating a TSO address space in a processor;
- sending an instruction to an operating system to start the TSO address space; and
- sending a message queue identifier associated with the message queue and an address space token associated with the TSO address space to the client.

15. The storage medium of claim 14, wherein the method further comprises sending a message queue identifier associated with the message queue and an address space token associated with the TSO address space to the client responsive to determining that an existing TSO address space associated with the user of the client is available.

16. The storage medium of claim 14, wherein the creating the TSO address space in the processor comprises:
- establishing a security environment in the created TSO address space;
- conducting a TSO address space logon; and
- initializing communications with the client via the message queue associated with the TSO address space.

17. The storage medium of claim 16, wherein the conducting the TSO address space logon comprises:
- defining a TSO logon command with data retrieved from a session table; and
- logging onto the TSO address space using the TSO logon command.

18. The storage medium of claim 16, wherein the initializing communication with the client via the message queue associated with the TSO address space comprises sending a message to the client via the message queue.

19. The storage medium of claim 14, wherein the method further comprises:
- determining whether the security object has been saved successfully and whether the message queue and TSB have been generated successfully;
- sending an error message to the client responsive to determining that the security object has not been saved successfully; and
- sending an error message to the client responsive to determining that at least one of the message queue and the TSB have not been generated successfully.

20. The storage medium of claim 14, wherein the method is at least partially performed by the launcher API.

* * * * *